Patented Jan. 27, 1942

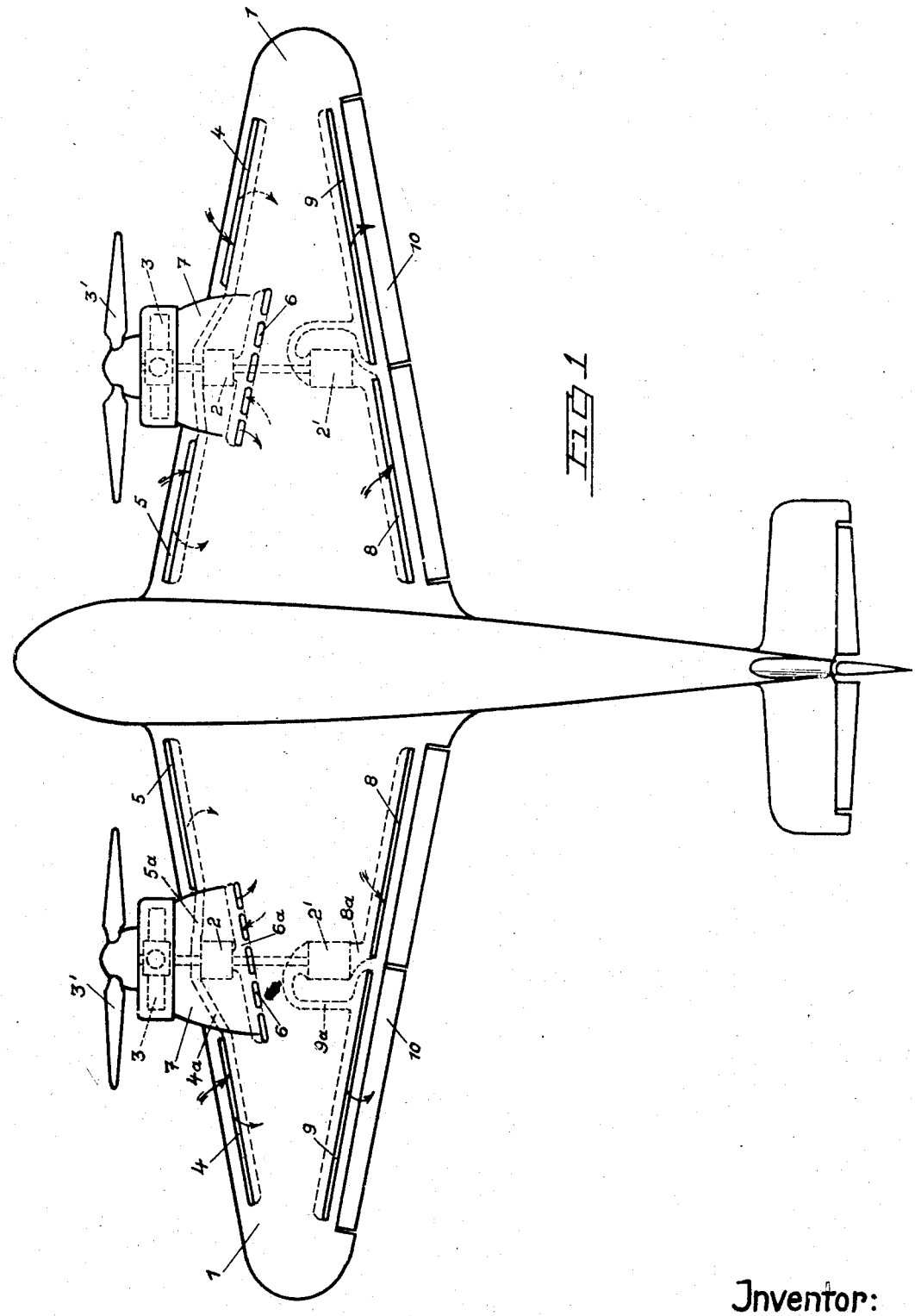

2,270,920

UNITED STATES PATENT OFFICE 2,270,920

ARRANGEMENT FOR EXHAUSTING AND DISCHARGING AIR FROM AND INTO THE SKIN LAYER

Georg Backhaus, Dessau, Germany, assignor to Junkers Flugzeug-und-Motorenwerke Aktiengesellschaft, Dessau, Germany, a corporation of Germany Application February 23, 1940, Serial No. 320,405
In Germany December 8, 1938

9 Claims. (Cl. 244—40)

This invention relates to improvements in arrangements for exhausting and discharging air from and into the skin layer, and refers particularly to means for so doing adjacent different portions of a wing which are longitudinally spaced from one another.

While means have already been employed for exhausting and discharging air from and into the skin layer the known arrangements are open to the objection that an excessive volume of air must be pumped, usually by a single blower or air pumping mechanism, in order to obtain an effective increase in lifting power at larger angles of incidence, and consequently very large and heavy blowers or air pumping mechanisms must be provided which occupy a considerable amount of valuable space and add materially to the weight of the airplane.

It is an object of the invention to provide an arrangement for exhausting and discharging air from and into the skin layer consisting of separate and relatively small blowers, or air pumping mechanisms, both of which may be operated selectively from a common driving means such as a propeller motor, and to space the openings or slots through which air is exhausted and discharged by each blower longitudinally from one another upon a wing. It is found that adjacent the front of a wing on the upper side thereof very low air pressure and very high air velocity occurs, so that by providing slots through which air is exhausted adjacent the front of a wing and substantially parallel with its front margin an effective increase in lifting power at larger angles of incidence may be obtained with the use of a blower of relatively speaking quite limited capacity. By providing two blowers, one to handle the air from the skin layer adjacent the front of the wing and one to handle the air from adjacent the rear portion thereof, and particularly with the high operating efficiency referred to, much smaller blowers may be successfully employed, with a marked saving in space and also considerable decrease in weight.

Another object of the invention is to provide an arrangement for exhausting and discharging air from and into the skin layer including separate pumping means, each or both of which may be operated from a common driving means, for exhausting and discharging air from and into the skin layer adjacent one or other, or both, of two different zones of the wing which are longitudinally spaced from one another.

A further object of the invention is to provide an arrangement for exhausting and discharging air from and into the skin layer including air inlets or outlets on both sides of a portion of a wing the aerodynamic form of which is interrupted by a projection necessitated by a motor mounting or the like, and to provide outlets or inlets in the wing rearwardly of the said projections.

Having thus broadly and briefly stated some of the major objects and advantages of the invention, I will now proceed to describe a preferred embodiment thereof with the aid of the accompanying drawing, in which:

Figure 1 illustrates a plan view of an airplane equipped with the invention.

Referring to the drawing, 1 designates the wings of an airplane each of which has a front blower 2 and a rear blower 2' mounted therein. Each pair of blowers 2 and 2' is operated by a motor 3 which also turns a propeller 3'. If air is drawn into one of the front blowers 2 through the adjacent slots or openings 4 and 5 located adjacent and substantially parallel with the front margin of one wing 1, and discharged through the slots or openings 6, this air leaves the latter openings at a velocity greater than that of the relative airflow around the wing. The slots or openings 6, which are positioned somewhat rearwardly of the slots 4 and 5, and behind projections 7 on the wings 1, counterbalance the interruption of the aerodynamic flow resulting from these projections provided for mountings for the motors. It is of course understood that appropriate passages 4a, 5a and 6a connect the openings 4, 5 and 6 respectively with the blowers 2.

In each rear wing zone a blower 2' exhausts air from the upper wing surfaces through openings 8 and suitable connections 8a and delivers it through other suitable connections 9a and openings 9. Moreover both sets of openings 8 and 9 are arranged in front of flaps 10 and are substantially parallel with one another.

While the direction of the airflow between the openings 4 and 5, and 6 may be reversed as indicated by the dual set of arrows in the drawing, the air handled by the rear blowers 2' should always flow in the direction of the arrows shown, namely in through the openings 8 adjacent the fuselage and out through the openings 9 remote therefrom.

Due to the position of the openings 4 and 5 adjacent the front of the wings, and to the fact that air is discharged at greater relative velocity through the openings 6, it is found that even at greater angles of incidence an effective lifting power can be obtained with the use of blowers 2 of relatively limited capacity.

While in the foregoing the preferred arrangement of the invention has been described and shown it is understood that alterations and modifications may be made thereto provided these alterations and modifications fall within the scope of the appended claims.

What I claim is:

1. An arrangement of the character described comprising an airplane wing, a blower mounted therein, said wing having a passage therein communicating with the upper wing surface through longitudinally spaced slots extending along the leading edge of the wing, said wing having a second passage therein communicating with an opening through the upper wing surface extending substantially parallel to the slots and located in an intermediate section of the wing rearwardly of said slots to substantially bridge the space between them, means connecting said blower to said slot passage and said second passage as to draw air from the one and discharge it through the other.

2. An arrangement of the character described comprising an airplane wing, a blower mounted therein, said wing having a passage therein communicating with the upper wing surface through longitudinally spaced slots extending along the leading edge of the wing, said wing having a second passage therein communicating with an opening through the upper wing surface extending substantially parallel to the slots and located in an intermediate section of the wing rearwardly of said slots to substantially bridge the space between them, means connecting said blower to said slot passage and said second passage as for drawing air from the one and discharge it through the other, said wing having two passages therein substantially parallel with the rear margin thereof, each of said passages communicating with openings formed through the upper wing surface, and a second blower mounted in said wing, said two passages being connected to opposite sides, respectively, of the second blower.

3. An arrangement of the character described comprising an airplane wing, a blower mounted therein, said wing having a passage therein communicating with the upper wing surface through longitudinally spaced slots extending along the leading edge of the wing, and said wing having a second passage therein from which spaced openings extend through the upper wing surface substantially parallel to the slots and are located in an intermediate section of the wing rearwardly of said slots to substantially bridge the space between them, means connecting said blower to said slot passage and to said second passage as to draw air from the one and discharge it through the other.

4. The arrangement set forth in claim 1 wherein the wing carries a propeller motor forwardly thereof intermediate its length, the slots are on opposite sides of the motor, and the opening extends across the rear of the motor.

5. The arrangement set forth in claim 1 wherein the blower is between the forward slots forwardly of the opening.

6. An arrangement of the character described comprising an airplane wing, two separate blowers mounted thereon, said wing having passages formed therein and connected to one side of one blower, some of the passages extending substantially parallel with the front margin of the wing adjacent thereto, openings from each of said front passages through the upper wing surface, said wing having another passage therein disposed intermediate the ends of the wing section rearwardly of the front passages and substantially parallel therewith, said other passage being connected to the other side of the one blower and opening therefrom through the upper wing surface along a line longitudinally offset from said parallel passages, said wing having two passages formed therein substantially parallel with the rear margin thereof, each of said passages communicating with openings through the upper wing surface, said passages being connected to opposite sides, respectively, of the other blower.

7. The arrangement set forth in claim 6 wherein the blowers are in longitudinal alignment, and a motor is mounted on the wing for driving the same.

8. The arrangement set forth in claim 6 wherein a motor is mounted on the wing, a propeller is driven by the motor, and means are provided connecting the motor to both blowers for driving the same.

9. The arrangement set forth in claim 6 wherein a projection is formed on the wing intermediate its spread, thereby interrupting the aerodynamic form thereof, and the passages extending parallel with the front margin of the wing are on opposite sides of said projection, the other passage extending longitudinally of the wing behind said projection.

GEORG BACKHAUS.